March 14, 1950   F. W. KLAY   2,500,419
LAWN MOWER
Filed Feb. 14, 1947   3 Sheets-Sheet 1
FIG_1_
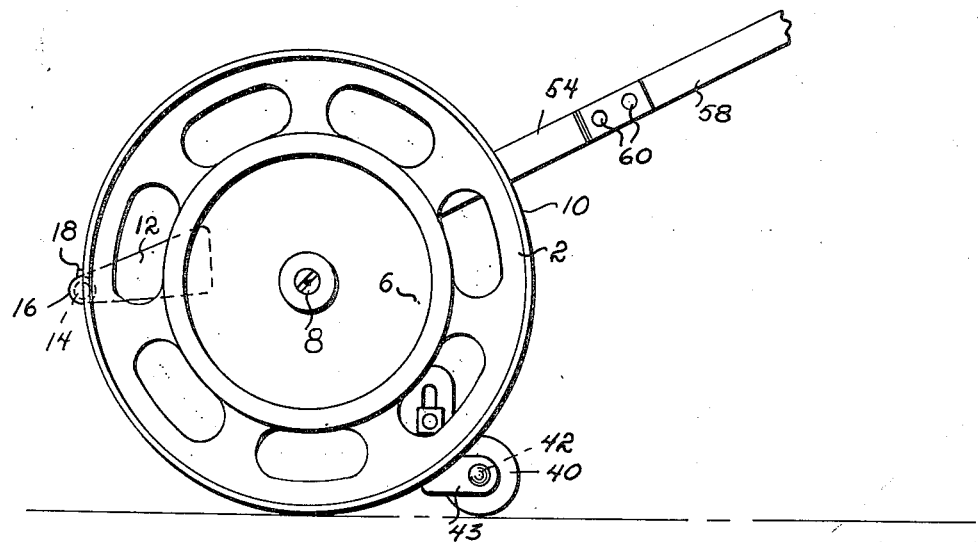
FIG_2_
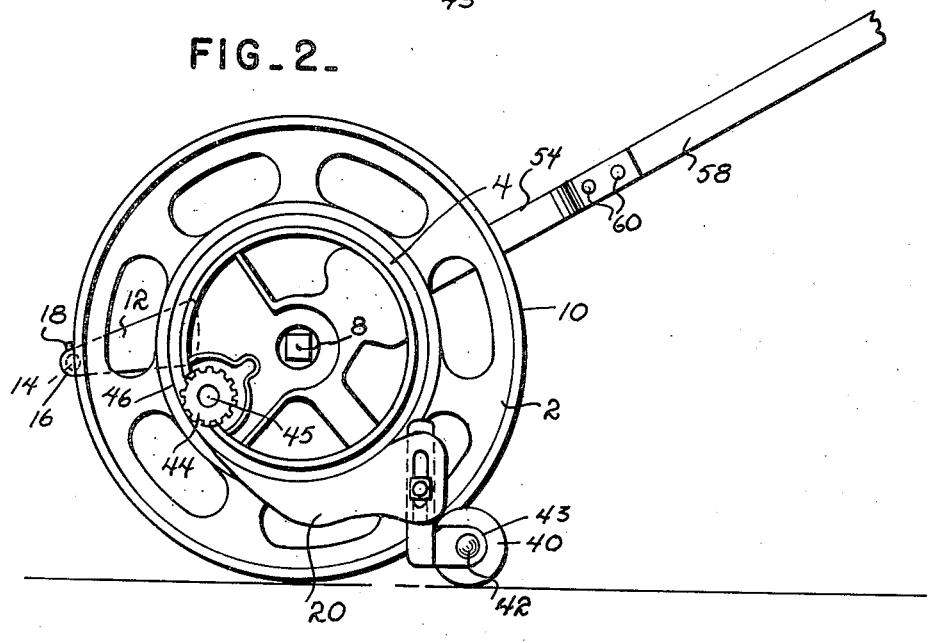
INVENTOR.
FRED W. KLAY
BY *Victor J. Evans & Co.*
ATTORNEYS March 14, 1950  F. W. KLAY  2,500,419
LAWN MOWER
Filed Feb. 14, 1947  3 Sheets-Sheet 2
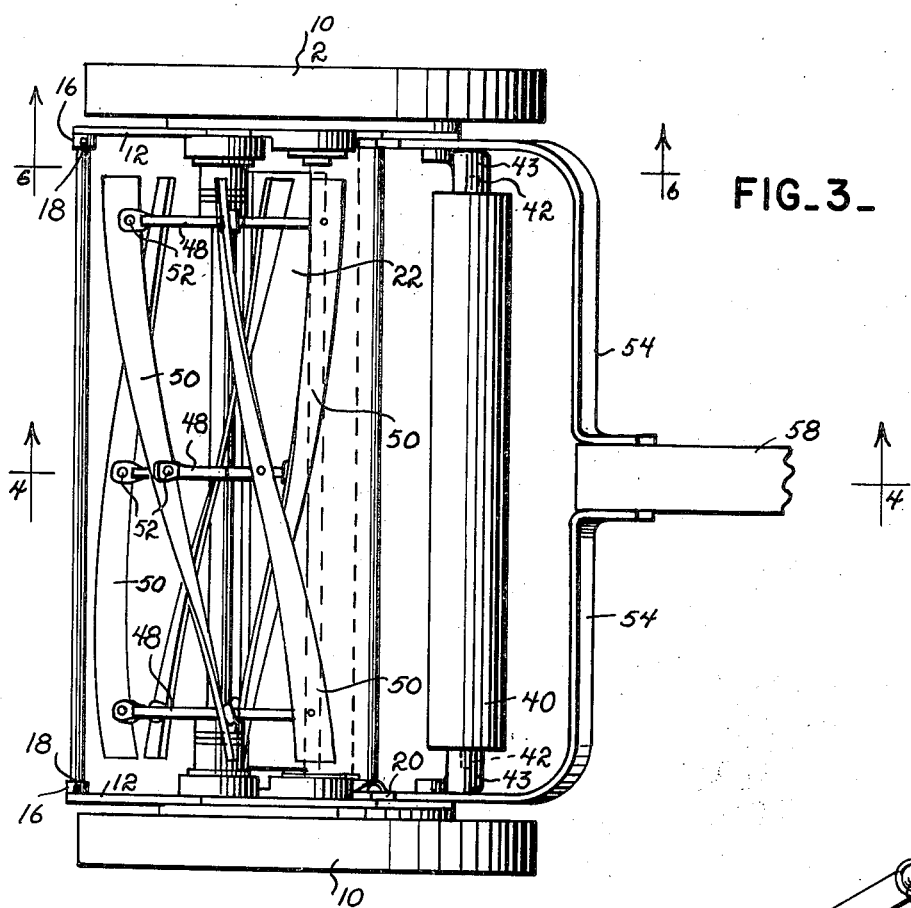
FIG_3_
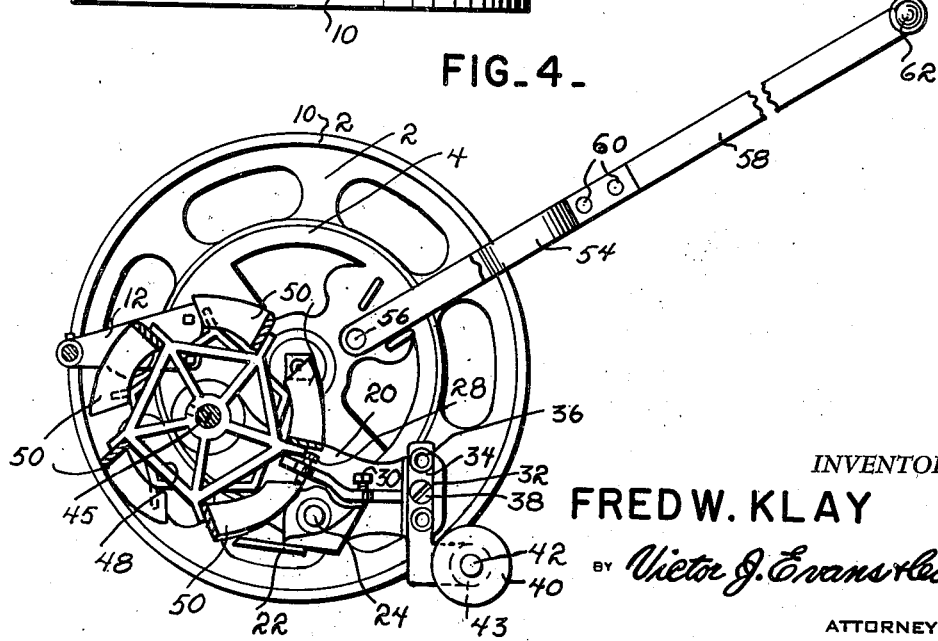
FIG_4_
INVENTOR.
FRED W. KLAY
BY *Victor J. Evans & Co.*
ATTORNEYS March 14, 1950     F. W. KLAY     2,500,419
LAWN MOWER
Filed Feb. 14, 1947     3 Sheets-Sheet 3
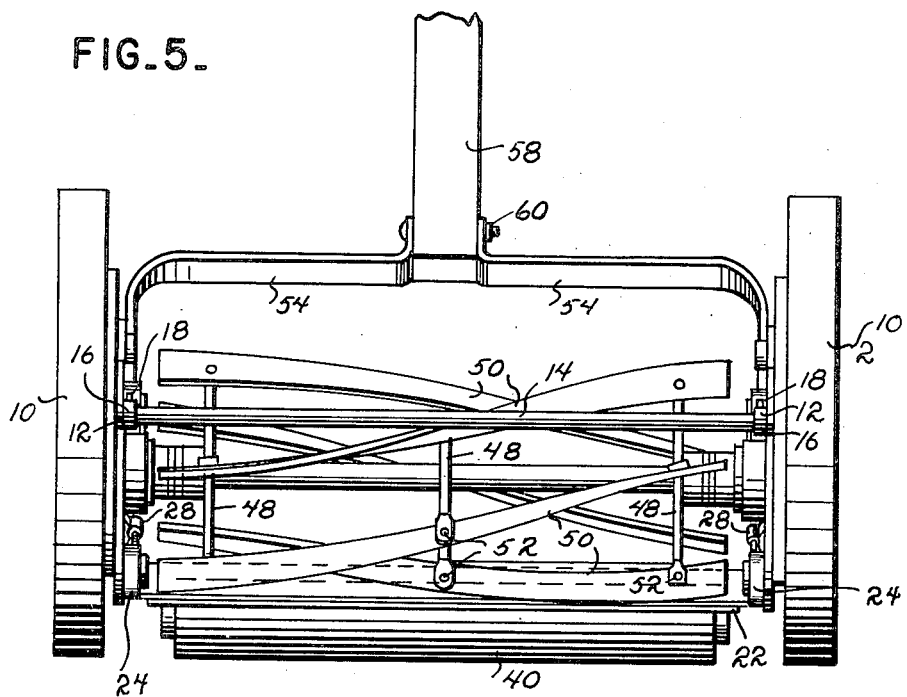
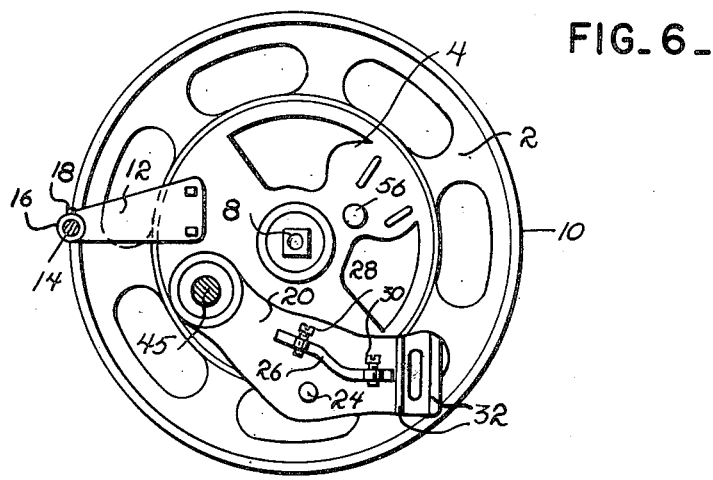
INVENTOR.
FRED W. KLAY
BY *Victor J. Evans & Co.*
ATTORNEYS Patented Mar. 14, 1950

2,500,419

UNITED STATES PATENT OFFICE 2,500,419

LAWN MOWER

Fred W. Klay, Pana, Ill.

Application February 14, 1947, Serial No. 728,576

1 Claim. (Cl. 56—249)

My present invention relates to an improved lawn mower and more especially to the reel type of mower wherein the reeling is rotated by driving engagement with the mower wheels. In the conventional type of mower, the driving pinion and reel, together with the bed plate, are located between the wheels and rearward of the axis of the wheels. The result of this arrangement is a constant upthrust on the bearings while the mower is in operation with an absence of thrust while the mower is standing. It is therefore difficult to obtain a nice adjustment of the cutting reel with relation to the bed plate while the machine is idle which will continue while the machine is in motion.

It is therefore the object of this invention to obviate the upthrust by locating the pinion, cutter reel, and bed plate forward of the driving wheel axis so that instead of upthrust, the bearings will be subject to downthrust and by this means the difference in clearance between the cutting reel and the bed plate will be negligible.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is an end elevational view of the mower of my invention.

Fig. 2 is a similar view with the wheel cover plate removed.

Fig. 3 is a top plan view.

Fig. 4 is a sectional view at line 4—4 of Fig. 3.

Fig. 5 is a front elevational view.

Fig. 6 is a sectional view at line 6—6 of Fig. 3.

Referring now to the drawings wherein I have illustrated the present preferred embodiment of my invention, I provide in the mower a pair of ground-engaging drive wheels 2 supported on frames 4 having cover-plates 6 secured by screws 8. The rims 10 are normally ribbed to increase the friction between the rims and the ground.

From the upper forward quarter of the wheel frames I provide brackets 12 in which the brush bar 14 is secured through collars 16 having screws 18.

Each wheel frame supports the forward end of the frame arms 20 pivotally mounted in the lower forward quarter of the wheel frames, and below the wheel frame centers I mount the bed knife 22 pivoted at 24 and the arms 20 carrying adjusting bars 26 having set screws 28 and 30 to move the bed knife for adjustment with relation to the reel hereinafter described.

The rear ends of the arms 20 are formed with ribs 32 forming a groove to receive the brackets 34 having selectively employed holes 36 for bolts 38, and the roller 40 has stub shafts 42 journaled in the lugs 43 of the brackets 34.

The pinions 44 are driven by the ring gears 46 on the wheels 2 and 4 and the shaft 45 for the pinion keyed thereto forms the center shaft of the spider frame 48 carrying cutter bars 50 secured by rivets 52.

Handle frame bars 54 are pivoted at 56 on the wheel frames 4 and the handle 58 is secured between the bars 54 as by bolts 60. The cross bar 62 affords ease in pushing the mower in conventional manner.

With the frame arms 20 and the cutter reel supported in the lower forward quarter of the wheel frames it will be apparent that the driving thrust will be downward or counterclockwise in Fig. 4 and the bed plate may be adjusted to proper clearance with regard to the reel so that the same clearance will be maintained when rotating as when idle.

Thus better cutting will result with less adjustment necessary and with the reel located forward of the wheel frames, the grass may be cut to a point considerably in advance of the maximum cutting degree of the conventional mower with the cutter reel rearward.

Having thus fully described my invention what I claim as new and desire to secure by Letters Patent is:

In a lawn mower the combination with a pair of driving wheels and their wheel frames, of a cutting reel pivotally mounted forward of the vertical center of the wheels and in the frames, a pair of frame arms pivoted co-axially with the axis of the reel, and a bed plate between the frame arms pivoted rearward of said vertical center, and a brush bar between the parallel vertical planes of the wheels and forward of the wheel perimeters.

FRED W. KLAY.

REFERENCES CITED

The following references are of record in the file of this patent:

UNITED STATES PATENTS

| Number | Name | Date |
|---|---|---|
| 597,972 | Graham | Jan. 25, 1898 |
| 1,251,022 | Henriksen | Dec. 25, 1917 |
| 1,778,219 | Kuhlman | Oct. 14, 1930 |
| 2,283,161 | Booton | May 19, 1942 |